United States Patent [19]

Renken et al.

[11] Patent Number: 4,652,625

[45] Date of Patent: Mar. 24, 1987

[54] N-AMINOPROPYL DERIVATIVES OF 2,4-DIAMINO-2-METHYLPENTANE AS EPOXY CURING AGENTS

[75] Inventors: Terry L. Renken; George P. Speranza; Harold G. Waddill, all of Austin, Tex.

[73] Assignee: Texaco Inc., White Plains, N.Y.

[21] Appl. No.: 830,143

[22] Filed: Feb. 18, 1986

[51] Int. Cl.[4] .............................................. C08G 59/50
[52] U.S. Cl. ................................... 528/123; 525/504; 528/361; 528/373; 528/407
[58] Field of Search ...................... 528/123, 407, 361; 525/504

[56] References Cited

U.S. PATENT DOCUMENTS

| | | |
|---|---|---|
| 2,486,648 | 3/1947 | Haury . |
| 4,126,640 | 11/1978 | Floyd .................................. 564/512 |
| 4,201,854 | 5/1980 | Zondler ......................... 528/123 X |
| 4,293,682 | 10/1981 | Kluger et al. ....................... 528/123 |
| 4,391,957 | 7/1983 | Becker . |
| 4,537,601 | 8/1985 | Naiman . |

FOREIGN PATENT DOCUMENTS 680997  2/1949  United Kingdom .

*Primary Examiner*—Earl Nielsen
*Attorney, Agent, or Firm*—Jack H. Park; Kenneth R. Priem

[57] ABSTRACT

N-aminopropyl derivatives of 2,4-diamino-2-methylpentane show rapid curing when used to cure epoxy resins.

4 Claims, No Drawings

N-AMINOPROPYL DERIVATIVES OF 2,4-DIAMINO-2-METHYLPENTANE AS EPOXY CURING AGENTS

BACKGROUND OF THE INVENTION

1. Field of the Invention

This invention concerns the use of N-aminopropyl derivatives of 2,4-diamino-2-methylpentane as epoxy curing agents.

2. Description of the Related Art

Epoxy resins constitute a broad class of polymeric materials having a wide range of physical characteristics. The resins are characterized by epoxide groups which are cured by reaction with certain catalysts or curing agents to provide cured epoxy resin compositions with certain useful properties. Conventional curing agents include such compounds as polyamines, polycarboxylic acids, anhydrides and Lewis acids.

The use of diamines as epoxy curing agents has long been known in the art. British Pat. No. 680,997 is one of numerous disclosures of the use of a diamine to cure resinous compositions. In particular, diacetone diamine (2,4-diamino-2-methylpentane) is disclosed as a preferred diamine for epoxy curing.

Appicants have verified that this diamine is very useful for curing epoxy resins where slow curing times are required. However, the user of 2,4-diamino-2-methylpentane suffers the hazards imposed by its toxicity. Toxicity tests have shown that 2,4-diamino-2-methylpentane is extremely irritating to the eyes and skin, and oral ingestion tests show an $LD_{50}$ of 0.431 g/kilogram, classifying it as a toxic material. Applicants have no toxicity data on N-aminopropyl derivatives of 2,4-diamino-2-methylpentane. However, our data show the N-aminopropyl derivatives to be less volatile than 2,4-diamino-2-methylpentane. This material should, however, first be tested for toxicity by any user.

U.S. Pat. No. 2,486,648 to Haury describes a method for preparing diamines such as 2,4-diamino-2-methylpentane from pyrimidines. In particular, Haury describes experimentally the reduction of the tetrahydropyrimidine shown below.

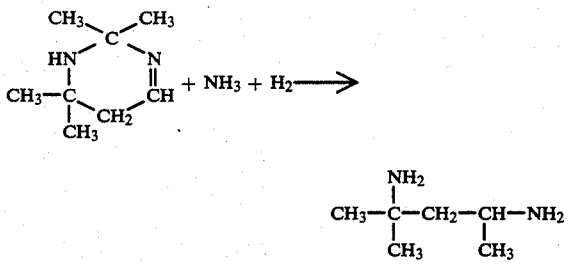

Many other derivatives of tetrahydropyrimidines are proposed for study, including, in a very broad sense, the derivatives used by applicants to cure epoxy resins. Haury makes no mention of the use of his derivatives as epoxy curing agents. An example of a substituted pyrimidine ring similar to the type Haury describes as useful for the preparation of diamines is found in U.S. Pat. No. 4,391,957, FIG. V of Drawing I.

Other derivatives of 2,4-diamino-2-methylpentane are also known. U.S. Pat. No. 4,537,601 mentions that N-isopropyl-2,4-diamino-2-methylpentane is useful for reacting with a maleic group to form an imide in the preparation of antistatic compositions.

Applicants' invention is the use of N-aminopropyl derivatives of 2,4-diamino-2-methylpentane as epoxy curing agents, and the resulting epoxy resin compositions. Among other improvements over the use of 2,4-diamino-2-methylpentane as an epoxy curing agent, it was found that N-aminopropyl derivatives of this diamine substantially reduce the gel time.

SUMMARY OF THE INVENTION

The invention is a process for curing epoxy resins comprising the addition to a liquid epoxy resin of an effective amount of an epoxy curing agent comprising N-aminopropyl-2,4-diamino-2-methyl pentane and/or bis(N-aminopropyl)-2,4-diamino-2-methylpentane.

DESCRIPTION OF THE PREFERRED EMBODIMENTS

The synthesis of N-aminopropyl-2,4-diamino-2-methylpentane and bis(N-aminopropyl)-2,4-diamino-2-methylpentane is accomplished by reacting 2,4-diamino-2-methylpentane with acrylonitrile and then subjecting the product of that reaction to reduction via the addition of hydrogen, ammonia and a cobalt- and/or nickel-containing hydrogenation catalyst. If a solvent is used, it is preferred that the solvent be methanol. It is further preferred that the hydrogenation catalyst is a cobalt-copper-chromium catalyst.

The reaction conditions for the reduction of the 2,4-diamino-2-methylpentane/acrylonitrile adducts are preferably a temperature range of from about 80° to about 150° C. at a pressure of from about 500 to about 3000 psig.

The N-aminopropyl derivatives of 2,4-diamino-2-methylpentane are useful for curing epoxy base resins. Generally, the epoxy base resin is a vicinal polyepoxide containing compound having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic halogen atoms and the like.

Preferred polyepoxides are those of glycidyl ethers prepared by epoxidizing the corresponding alkyl ethers or reacting, by known procedures, a molar excess of epichlorohydrin and an aromatic polyhydroxy compound; i.e., isopropylidene bisphenol, novolac, resorcinol, derivatives of aromatic amines, etc. The epoxy derivatives of methylene or isopropylidene bisphenols are especially preferred. The condensation product of epichlorohydrin with Bisphenol A is particularly preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive 1,2-epoxy groups per molecule. An illustrative, but by no means exhaustive, listing of suitable dihydric phenols includes 4,4-isopropylidene bisphenol, 2,4-dihydroxydiphenylethylmethane, 3,3'-dihydroxydiphenyldiethylmethane, 3,4-dihydroxydiphenylmethylpropylmethane, 2,3'-dihydroxydiphenylethylphenylmethane, 4,4'-dihydroxydiphenylpropylphenylmethane, 4,4'- dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones; e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexantriol, trimethylolpropane, mannitol, sorbitol, erythritol, pentaerythritol, their dimers, trimers and higher polymers; e.g., polyethylene glycols, polypropylene glycols, triglycerol, dipentaerythritol and the like, polyallyl alcohol, polyhydric thioethers, such as 2,2'-3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst; e.g., sodium or potassium hydroxide, an epihalohydrin, such as epichlorohydrin, with the resinous condensate of an aldehyde; e.g., formaldehyde, and either a monohydric phenol; e.g., phenol itself, or a polyhydric phenol. Further details concerning the nature and preparation of these epoxy novolac resins can be obtained in Lee, H. and Neville, K., *Handbook of Epoxy Resins*, McGraw-Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

To cure the epoxy resin, the curing agent is mixed with the polyepoxide in an amount such that there is one reactive hydrogen atom in the curing component for each epoxy group in the epoxy resin component. The stoichiometric quantity can be calculated from the knowledge of the chemical structure and analytical data on the component. When stoichiometry is not calculable, the proper amount of curative is that amount necessary to produce the most advantageous properties. This amount must be determined experimentally and can be accomplished by routine procedures known in the art. Generally, the number of equivalents of reactive curative groups is from about 0.8 to 1.2 times the number of epoxide equivalents present in the curable epoxy resin composition, with from 0.9 to a stoichicmetric amount being preferred. The exact amount of constituents in accordance with the above general requirements will depend, as mentioned, primarily on the application for which the cured resin is intended.

The invention will be further illustrated by the following non-limiting examples.

EXAMPLE 1

Preparation of N-Aminopropyl Derivatives of 2,4-Diamino-2-Methylpentane 2,4-diamino-2-methylpentane (465 g, 4.00 moles) was charged to a 2-liter flask fitted with a mechanical stirrer, addition funnel and thermometer. The 2,4-diamino-2-methylpentane was heated to 60° C. with stirring and acrylonitrile (318 g, 6.00 moles) was then added dropwise over 2.5 hours. The mixture was heated at 60° C. for another 4.5 hours, then cooled. This material was charged to a one-gallon stirred autoclave reactor along with 40 g of a commercial Co-Cu-Cr catalyst. The reactor was flushed with hydrogen; 307 g of ammonia was then charged and the reactor was pressurized to 2000 psig with hydrogen. The reactor was heated to 150° C. and the mixture was stirred. Hydrogen was being consumed by the time the reactor reached 108° C. When the pressure dropped below 2000 psig, the reactor was repressured to 2500 psig. After 2 hours at 150° C. no further uptake of hydrogen was observed, so the reactor was cooled, the hydrogen and ammonia were vented and the liquid contents remaining were filtered to remove catalyst. The filtrate was analyzed by gas chromatography and found to contain 51.7% N-aminopropyl derivative of 2,4-diamino-2-methylpentane and 46.8% bis(N-aminopropyl) derivatives of 2,4-diamino-2-methylpentane. This material was distilled through a packed 1.5 foot column to give 307.9 g of the N-aminopropyl derivative (boiling point 86°–87° C., 5 mm) and 274.5 g of the bis(N-aminopropyl) derivative (boiling point 145°–150° C., 6 mm). Nuclear magnetic resonance analyses indicated that the N-aminopropyl derivative material corresponded to structure I and that the bis(N-aminopropyl) derivative material corresponded to a mixture of II and III. The following analytical results were obtained for these two materials:

|  | N—aminopropyl 2,4-diamino-2-methylpentane | bis(N—aminopropyl) 2,4-diamino-2-methylpentane |
| --- | --- | --- |
| Wt. % N | 23.8 | 23.7 |
| Total amine, meq/g | 17.2 | 17.3 |
| Primary amine, meq/g | 11.3 | 9.8 |
| Tertiary amine, meq/g | — | 1.7 |

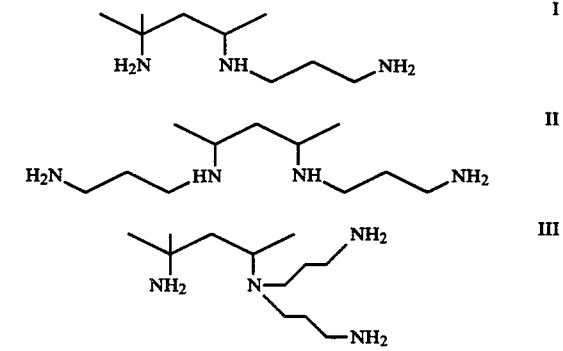

The following data on the boiling points of mono and bis(N-aminopropyl) derivatives of 2,4-diamino-2-methylpentane were obtained.

It was found that N-aminopropyl-2,4-diamino-2-methylpentane distills at 86° C. at a pressure of 5 mm. Bis(N-aminopropyl)-2,4-diamino-2-methylpentane distilled at 145° C. at a pressure of 6 mm. These boiling points were extrapolated to boiling points of 225° C. and 290° C., respectively, at atmospheric pressure. The boiling point of 2,4-diamino-2-methylpentane was found to be 155° C. at atmospheric pressure.

From this data it was determined that the mono and bis(N-aminopropyl) derivatives of 2,4-diamino-2-methylpentane are less volatile than 2,4-diamino-2-methylpentane.

EXAMPLE 2

Continuous Reduction of 2,4-Diamino-2-Methylpentane/Acrylonitrile Adducts to Give N-Aminopropyl Derivatives of 2,4-Diamino-2-Methylpentane 2,4-diamino-2-methylpentane (1600 g, 13.8 moles) was charged to a 5-liter flask equipped with an overhead stirrer, thermometer and addition funnel. The 2,4-diamino-2-methylpentane was heated to 60° C. with stirring and acrylonitrile (1461 g, 27.5 moles) was added over 4.5 hours. The temperature of the mixture was kept below 65° C. by changing the rate of addition of acrylonitrile. Stirring at 60° C. was continued for an additional 1.5 hour, then cooled. This material was combined with equal weights of methanol and ammonia and was used as feed for the continuous reduction. Commercial Co-Cu-Cr catalyst pellets were charged to a 50 cc upward flow tubular reactor. The liquid nitrile/methanol/ammonia feed was pumped through the reactor on a continuous basis for 202.5 hours at an average feed rate of 41.0 g/hour. Hydrogen (20 liters/hr calibrated at 0° C. and 1 atm.) was also fed through the reactor over this period of time. This amount of hydrogen constituted approximately a two-fold excess over that which was needed to bring about complete nitrile reduction. The reactor pressure was maintained at 2500 psig and the reactor temperature at 119° C. Analysis of the reactor effluent indicated that only a trace of nitrile was present. The product was found to contain 9.9 wt. % N-aminopropyl 2,4-diamino-2-methylpentane, 86.5 wt. % bis(N-aminopropyl) 2,4-diamino-2-methylpentane and 3.6 wt. % tris(N-aminopropyl) 2,4-diamino-2-methylpentane on an ammonia and methanol free basis.

EXAMPLE 3

Preparation of Cured Epoxy Resin With N-Aminopropyl Derivatives of 2,4-Diamino-2-Methylpentane Amine was combined with liquid epoxy resin, thoroughly mixed, degassed and poured into aluminum molds separated by ⅛-in. Teflon gasketing. Resin-amine mixture was then placed in an oven at an elevated temperature and completely cured. Among other improvements, it was found that the use of N-aminopropyl derivatives of 2,4-diamino-2-methylpentane substantially reduced the gel time.

| Formulation | A | B | C |
|---|---|---|---|
| Liquid epoxy resin (EEW ~185) | 100 | 100 | 100 |
| 2,4-Diamino-2-Methylpentane | 18 | — | — |
| N—Aminopropyl 2,4-diamino-2-methylpentane[1] | — | 19 | — |
| Bis(N—aminopropyl) 2,4-diamino-2-methylpentane[1] | — | — | 21 |
| Exothermic Properties | | | |
| Viscosity (Brookfield), cps, ~25° C. | 650 | 1500 | 2300 |
| Gel time (200 g mass), minutes | 128.8 | 78.1 | 56.3 |
| Peak exothermic temp., °C. | 201.3 | 218.9 | 236.1 |
| Time to peak exothermic temp., min. | 139.0 | 89.0 | 67.0 |
| Properties of Cured ⅛in. Castings[2] | | | |
| IZOD impact strength, ft.-lbs./in. | 0.13 | 0.11 | 0.09 |
| Tensile strength, psi | 8750 | 10400 | 9700 |
| Tensile modulus, psi | 433000 | 391000 | 347000 |
| Elongation at break, % | 2.6 | 4.8 | 4.8 |
| Flexural strength, psi | 17200 | 16300 | 15600 |
| Flexural modulus, psi | 408000 | 407000 | 362000 |
| HDT, °C., 264 psi/66 psi | 122/126 | 127/134 | 131/134 |
| Shore D hardness, 0–10 sec. | 74–72 | 74–72 | 75–73 |
| Adhesion Properties[3] | | | |
| Tensile shear strength, psi | 2900 | 2000 | 1600 |
| T-peel strength, pli | 2.5 | 3.5 | 4.1 |

[1]See Example 1 for description of amine and properties.
[2]Cured overnight, ~25° C., then 2 hours at 80° C., 3 hours at 125° C.
[3]Cured overnight, ~25° C., then 1 hour at 125° C.

We claim:
1. A process for curing epoxy resins comprising the addition to a liquid epoxy resin of an effective curing amount of an epoxy curing agent comprising N-aminopropyl-2,4-diamino-2-methylpentane.
2. A process for curing epoxy resins comprising the addition to a liquid epoxy resin of an effective curing amount of an epoxy curing agent comprising bis(N-aminopropyl)-2,4-diamino-2-methylpentane.
3. An epoxy resin composition comprising:
   (a) a vicinal polyepoxide having an average of at least 1.8 reactive 1,2-epoxy groups per molecule, and
   (b) an effective curing amount of N-aminopropyl-2,4-diamino-2-methylpentane.
4. An epoxy resin composition comprising:
   (a) a vicinal polyepoxide having an average of at least 1.8 reactive 1,2-epoxy groups per molecule, and
   (b) an effective curing amount of bis(N-aminopropyl)-2,4-diamino-2-methylpentane.

* * * * *